United States Patent
Patwardhan et al.

(10) Patent No.: US 12,018,347 B2
(45) Date of Patent: *Jun. 25, 2024

(54) SYSTEMS AND METHODS FOR RECOVERING LITHIUM FROM BRINES

(71) Applicant: ENERGY EXPLORATION TECHNOLOGIES, INC., Austin, TX (US)

(72) Inventors: Amit Patwardhan, Austin, TX (US); Teague Egan, Dorado, PR (US)

(73) Assignee: Energy Exploration Technologies, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/602,808

(22) PCT Filed: May 12, 2021

(86) PCT No.: PCT/US2021/032027
§ 371 (c)(1),
(2) Date: Nov. 18, 2021

(87) PCT Pub. No.: WO2021/231597
PCT Pub. Date: Nov. 18, 2021

(65) Prior Publication Data
US 2023/0192503 A1    Jun. 22, 2023

Related U.S. Application Data
(60) Provisional application No. 63/023,528, filed on May 12, 2020.

(51) Int. Cl.
C22B 3/02        (2006.01)
B01D 1/00        (2006.01)
(Continued)

(52) U.S. Cl.
CPC ............ C22B 26/12 (2013.01); B01D 1/0035 (2013.01); B01D 61/243 (2013.01); B01D 61/46 (2013.01);
(Continued)

(58) Field of Classification Search
CPC .... C22B 26/12; B01D 1/0035; B01D 61/243; B01D 61/46; C01D 15/04; C01D 15/06; C02F 1/14; C02F 2101/10; C25C 1/02
See application file for complete search history.

(56) References Cited

U.S. PATENT DOCUMENTS

2011/0300041 A1    12/2011  Galli et al.
2013/0101484 A1     4/2013  Perez et al.
2019/0048483 A1*    2/2019  Swonger ................. C25C 1/02

FOREIGN PATENT DOCUMENTS

AR    106964    3/2018
AR    108604    9/2018
(Continued)

OTHER PUBLICATIONS

Argentinian Office Action for AR Application No. 2020102620 dated Sep. 18, 2023, 22 pages with machine translation.
(Continued)

*Primary Examiner* — Zulmariam Mendez
(74) *Attorney, Agent, or Firm* — Parker Highlander PLLC

(57) ABSTRACT

Systems and methods using solar evaporation to preconcentrate lithium containing brines to at or near lithium saturation, followed by a separation processes to separate lithium from impurities. A separated impurity stream is recycled to a point in the evaporation sequence where conditions are favorable for their precipitation and removal or disposed in a separate evaporation pond or reinjected underground, while a lower impurity stream is transferred to one or more of the removal location, to a subsequent pond in the
(Continued)

sequence, or to a lithium plant or concentration facility. Further concentration of lithium by evaporation can then take place because impurities are removed thus eliminating lithium losses due to co-precipitation and achieving significantly higher concentrations of lithium.

41 Claims, 10 Drawing Sheets

(51) Int. Cl.
  *B01D 61/24* (2006.01)
  *B01D 61/46* (2006.01)
  *C01D 15/04* (2006.01)
  *C01D 15/06* (2006.01)
  *C02F 1/14* (2023.01)
  *C22B 3/00* (2006.01)
  *C22B 3/22* (2006.01)
  *C22B 3/42* (2006.01)
  *C22B 3/44* (2006.01)
  *C22B 26/12* (2006.01)
  *C25C 1/02* (2006.01)
  *C02F 101/10* (2006.01)

(52) U.S. Cl.
  CPC ............. *C01D 15/04* (2013.01); *C01D 15/06* (2013.01); *C02F 1/14* (2013.01); *C22B 3/00* (2013.01); *C22B 3/22* (2013.01); *C22B 3/42* (2013.01); *C22B 3/44* (2013.01); *C25C 1/02* (2013.01); *C02F 2101/10* (2013.01)

(56) References Cited

FOREIGN PATENT DOCUMENTS

| | | |
|---|---|---|
| AR | 108605 | 9/2018 |
| AR | 108606 | 9/2018 |
| AR | 112370 | 10/2023 |
| CN | 109748298 | 5/2014 |
| CN | 108341421 | 7/2018 |
| EP | 3647267 A1 | 5/2020 |
| WO | WO2017096495 | 6/2017 |
| WO | WO2019002653 | 1/2019 |

OTHER PUBLICATIONS

Flexer et al., "Lithium recovery from brines: A vital raw material for green energies with a potential environmental impact on its mining and processing", *Science of the Total Environment*, 639:1188-1204, 2018.

* cited by examiner

Temp. 10 Centigrade

Well Brine → POND I → 266.77 TPH H2O → 2 → POND II → 272.36 TPH H2O → 5 → POND III → 70.22 TPH H2O → 8 → POND IV → 17.88 TPH H2O → 11

| Stream 1 | | Stream 2 | | Stream 5 | | Stream 8 | | Stream 11 | |
|---|---|---|---|---|---|---|---|---|---|
| TPH | 1000 | TPH | 624.41 | TPH | 252.43 | TPH | 137.72 | TPH | 108.99 |
| H2O | 71.59% | H2O | 71.24% | H2O | 66.98% | H2O | 65.09% | H2O | 62.02% |
| Na | 7.44% | Na | 5.79% | Na | 1.68% | Na | 0.48% | Na | 0.23% |
| K | 1.39% | K | 2.06% | K | 2.30% | K | 0.54% | K | 0.14% |
| Li | 0.07% | Li | 0.11% | Li | 0.27% | Li | 0.49% | Li | 0.46% |
| Mg | 1.33% | Mg | 2.07% | Mg | 5.00% | Mg | 6.98% | Mg | 8.19% |
| Ca | 0.10% | Ca | 0.01% | Ca | 0.00% | Ca | 0.00% | Ca | 0.00% |
| B | 0.07% | B | 0.11% | B | 0.27% | B | 0.21% | B | 0.18% |
| SO4 | 2.04% | SO4 | 2.53% | SO4 | 6.00% | SO4 | 4.47% | SO4 | 4.53% |
| Cl | 15.64% | Cl | 15.55% | Cl | 16.21% | Cl | 20.76% | Cl | 23.39% |

| Stream 4 | | Stream 7 | | Stream 10 | | Stream 13 | |
|---|---|---|---|---|---|---|---|
| NaCl | 96.37 | NaCl | 80.99 | NaCl | 9.04 | NaCl | |
| KCl | | KCl | 13.13 | KCl | 0.82 | KCl | |
| K2SO4.MgSO4.2CaSO4 | 7.00 | K2SO4.MgSO4.2CaSO4 | 0.51 | K2SO4.MgSO4.2CaSO4 | 0 | K2SO4.MgSO4.2CaSO4 | |
| CaSO4 | | CaSO4 | | CaSO4 | | CaSO4 | |
| MgCl2.6H2O | | MgCl2.6H2O | | MgCl2.6H2O | 0 | MgCl2.6H2O | |
| KCl.MgCl2.6H2O | | KCl.MgCl2.6H2O | | KCl.MgCl2.6H2O | 7.07 | KCl.MgCl2.6H2O | 4.18 |
| H3BO3 | | H3BO3 | | H3BO3 | 2.23 | H3BO3 | 0.47 |
| KCl.MgSO4.3H2O | | KCl.MgSO4.3H2O | | KCl.MgSO4.3H2O | 23.11 | KCl.MgSO4.3H2O | |
| LiCl.MgCl2.7H2O | | LiCl.MgCl2.7H2O | | LiCl.MgCl2.7H2O | 0 | LiCl.MgCl2.7H2O | 0 |
| MgSO4.H2O | | MgSO4.H2O | | MgSO4.H2O | 0 | MgSO4.H2O | |
| Li2SO4.H2O | | Li2SO4.H2O | | Li2SO4.H2O | 0 | Li2SO4.H2O | |

| | Stream 3 | | Stream 6 | | Stream 9 | | Stream 12 |
|---|---|---|---|---|---|---|---|
| TPH | 108.825 | TPH | | TPH | 99.615 | TPH | 44.49 | TPH | 10.85 |
| H2O | 3.95% | H2O | | H2O | 3.40% | H2O | 20.71% | H2O | 38.45% |
| Na | 35.15% | Na | | Na | 32.05% | Na | 8.02% | Na | 3.78% |
| K | 0.95% | K | | K | 7.08% | K | 11.38% | K | 5.45% |
| Li | 0.01% | Li | | Li | 0.01% | Li | 0.02% | Li | 1.60% |
| Mg | 0.34% | Mg | | Mg | 0.30% | Mg | 6.76% | Mg | 6.33% |
| Ca | 0.86% | Ca | | Ca | 0.06% | Ca | 0.00% | Ca | 0.00% |
| B | 0.01% | B | | B | 0.01% | B | 0.88% | B | 0.86% |
| SO4 | 4.23% | SO4 | | SO4 | 0.65% | SO4 | 20.21% | SO4 | 11.23% |
| Cl | 54.50% | Cl | | Cl | 56.39% | Cl | 27.71% | Cl | 28.55% |

FIGURE 9

| Temp | 10 Centigrade | | | | | | | | | | | | |
|---|---|---|---|---|---|---|---|---|---|---|---|---|---|
| | Well Brine | 1 | H2O | 694.17 TPH | 2 | H2O | 106.27 TPH | 5 | H2O | 39.47 TPH | 8 | H2O | 16.01 TPH |
| | | | 3 | | | 6 | | | 9 | | | 12 | |
| | | | POND | | | POND | | | POND | | | POND | |
| | | 4 | | | 7 | | | 10 | | | 13 | | |

Stream 1
| | |
|---|---|
| TPH | 1400 |
| H2O | 69.13% |
| Na | 10.90% |
| K | 0.65% |
| Li | 0.07% |
| Mg | 0.20% |
| Ca | 0.05% |
| B | 0.08% |
| SO4 | 1.40% |
| Cl | 17.31% |

Stream 2
| | |
|---|---|
| TPH | 342.6 |
| H2O | 70.35% |
| Na | 7.39% |
| K | 2.52% |
| Li | 0.28% |
| Mg | 0.78% |
| Ca | 0.04% |
| B | 0.26% |
| SO4 | 2.32% |
| Cl | 15.40% |

Stream 5
| | |
|---|---|
| TPH | 196.5 |
| H2O | 66.61% |
| Na | 5.48% |
| K | 4.22% |
| Li | 0.48% |
| Mg | 1.34% |
| Ca | 0.01% |
| B | 0.45% |
| SO4 | 3.67% |
| Cl | 15.37% |

Stream 8
| | |
|---|---|
| TPH | 135.6 |
| H2O | 66.86% |
| Na | 4.34% |
| K | 3.72% |
| Li | 0.69% |
| Mg | 1.93% |
| Ca | 0.00% |
| B | 0.40% |
| SO4 | 5.24% |
| Cl | 14.52% |

Stream 11
| | |
|---|---|
| TPH | 106.5 |
| H2O | 69.68% |
| Na | 3.03% |
| K | 3.08% |
| Li | 0.74% |
| Mg | 2.44% |
| Ca | 0.00% |
| B | 0.35% |
| SO4 | 4.77% |
| Cl | 13.78% |

Stream 4
| | |
|---|---|
| NaCl | 307.90 |
| Na2SO4.10H2O | 34.32 |
| CaSO4.2H2O | 1.83 |
| CaSO4 | |
| CaO.3B2O3.4H2O | 1.07 |
| H3BO3 | |
| KCl | |
| K2SO4.CaSO4.H2O | |
| MgCl2.6H2O | |
| L2SO4.K2SO4 | |
| MgSO4.7H2O | |
| Li2SO4.H2O | |

| TPH | 363.2774 |
|---|---|
| H2O | 8.99% |
| Na | 35.06% |
| K | 0.13% |
| Li | 0.01% |
| Mg | 0.04% |
| Ca | 0.15% |
| B | 0.06% |
| SO4 | 3.22% |
| Cl | 52.19% |

Stream 7
| | |
|---|---|
| NaCl | 36.69 |
| Na2SO4.10H2O | |
| CaSO4.2H2O | |
| CaSO4 | |
| CaO.3B2O3.4H2O | 0.02 |
| H3BO3 | |
| KCl | |
| K2SO4.CaSO4.H2O | 1.13 |
| MgCl2.6H2O | |
| L2SO4.K2SO4 | |
| MgSO4.7H2O | |
| Li2SO4.H2O | |

| TPH | 39.82998 |
|---|---|
| H2O | 9.67% |
| Na | 36.51% |
| K | 0.88% |
| Li | 0.02% |
| Mg | 0.07% |
| Ca | 0.35% |
| B | 0.03% |
| SO4 | 1.84% |
| Cl | 56.66% |

Stream 10
| | |
|---|---|
| NaCl | 12.30 |
| Na2SO4.10H2O | |
| CaSO4.2H2O | |
| CaSO4 | |
| CaO.3B2O3.4H2O | 1.86 |
| H3BO3 | |
| KCl | 6.08 |
| K2SO4.CaSO4.H2O | 0.07 |
| MgCl2.6H2O | |
| L2SO4.K2SO4 | |
| MgSO4.7H2O | |
| Li2SO4.H2O | |

| TPH | 21.37263 |
|---|---|
| H2O | 3.36% |
| Na | 22.85% |
| K | 15.18% |
| Li | 0.03% |
| Mg | 0.10% |
| Ca | 0.04% |
| B | 1.54% |
| SO4 | 0.46% |
| Cl | 49.15% |

Stream 13
| | |
|---|---|
| NaCl | |
| Na2SO4.10H2O | |
| CaSO4.2H2O | |
| CaSO4 | |
| CaO.3B2O3.4H2O | |
| H3BO3 | 1.00 |
| KCl | 1.79 |
| K2SO4.CaSO4.H2O | 0.02 |
| MgCl2.6H2O | |
| L2SO4.K2SO4 | |
| MgSO4.7H2O | 2.93 |
| Li2SO4.H2O | |

| TPH | 13.1096 |
|---|---|
| H2O | 3.49% |
| Na | 20.30% |
| K | 13.50% |
| Li | 1.13% |
| Mg | 0.12% |
| Ca | 0.02% |
| B | 1.35% |
| SO4 | 15.44% |
| Cl | 38.25% |

FIGURE 10

SYSTEMS AND METHODS FOR RECOVERING LITHIUM FROM BRINES

This application is a national stage § 371 application of International Application No. PCT/US2021/032027 filed May 12, 2021, which claims provisional priority to U.S. Patent Application No. 63/023,528 filed May 12, 2020, the contents of which are incorporated herein by reference.

FIELD

The present invention provides systems and methods for efficient extraction of lithium from brines, particularly high salt brines containing significant concentrations of sodium (Na/Na$^+$), potassium (K/K$^+$), magnesium (Mg/Mg$^{2+}$), calcium (Ca/Ca$^{2+}$), chloride (Cl/Cl$^-$), sulfate (SO$_4$/SO$_4^{2-}$), boron (B, ionic or molecular) and/or other ions that can lead to lithium (Li/Li$^+$) losses in new and existing processes for Li extraction from brine due to Li co-precipitation with such other ions. As a result of the systems and methods taught herein, significantly higher concentrations of lithium are possible, which is a significant benefit to the precipitation plant operations. The preferred systems and methods herein also require limited resources in terms of energy and water inputs and can recycle impurity ions back into the systems and methods so that they can be efficiently removed, resulting in surprisingly high yields of lithium from complex brines.

BACKGROUND

Nearly two-thirds of the lithium resources in the world reside in very high salinity brines with lithium concentrations ranging from 200 ppm-2000 ppm. Lithium in these brines is typically subterranean and associated with high levels of Na$^+$, K$^+$, Mg$^{2+}$, Ca$^{2+}$, Cl$^-$, SO$_4^{2-}$, B (ionic or molecular) and other ions (i.e., "impurity ions"). Each brine chemistry is unique. However, lithium-containing brines are broadly classified into high magnesium and high sulfate brines. Typical brine compositions from several major lithium producing regions are shown in Table 1.

Existing methods and systems for extracting lithium from brines are based on solar evaporation/concentration processes. In all such cases, major co-precipitation losses of lithium occur during evaporation and concentration processes. In high magnesium brines, these losses occur mainly as a lithium carnallite precipitate (LiCl·MgCl$_2$·7H$_2$O). In high sulfate brines, these losses occur mainly as lithium sulfate monohydrate (Li$_2$SO$_4$·H$_2$O) and lithium schoenite (Li$_2$SO$_4$·K$_2$SO4) precipitates. Losses of 40-70% of the valuable lithium resource occur because much of the lithium is sacrificed by co-precipitation to attain target lithium concentration.

Moreover, the known evaporation and concentration processes are typically accomplished using large solar evaporation ponds having a significant environmental footprint. Sub-surface brine and associated water is pumped to the surface for evaporation. A typical evaporation and concentration process is depicted in FIG. 1, indicating specific precipitations of different salts at different locations in the evaporation and concentration sequence.

Table 1. Typical Brine Compositions Found, for Example, in South America. The "High" Classifications are Based Upon Ratios of Impurity Ion to Li.

| Ion | Chile Atacama (ppm) | Argentina (ppm) High SO$_4^{2-}$ | Bolivia (ppm) High Mg$^{2+}$, SO$_4^{2-}$ |
| --- | --- | --- | --- |
| Li$^+$ | 1900 | 700 | 300 |
| Na$^+$ | 62000 | 110000 | 82000 |
| K$^+$ | 24900 | 5500 | 1500 |
| Mg$^{2+}$ | 12500 | 2000 | 6500 |
| Ca$^{2+}$ | 4100 | 500 | 500 |
| B (ionic) | 500 | 1000 | 200 |
| Cl$^-$ | 170000 | 170000 | 130000 |
| SO$_4^{2-}$ | 2000 | 14000 | 11000 |

Solutions to reduce the environmental footprint of lithium extraction are needed. The nearly universal approach is to selectively separate lithium from the feed well brine using nanofiltration, ion sorption, ion exchange, and/or electrodialysis processes. These methods also have significant limitations because the volumes of brine that must be treated are very large due to the low concentrations of lithium at this stage. Technologies like nanofiltration also cannot operate at the high levels of total dissolved solids in these brines, thus requiring a high degree of dilution with water to make nanofiltration separations possible. Water is a very scarce resource, particularly in arid regions, which leads to other socio-environmental impacts, in addition to further diluting the brines instead of concentrating them. In addition, nanofiltration and reverse osmosis processes require high pressures which represent a major operating cost. Shortcomings of ion exchange and ion sorption processes reside in the limited selectivity and specific capacities offered. These are also batch processes and require chemicals for elution of ions and large amounts of water for washing the resin or media beds. Disposal of this contaminated effluent is another problem. And, for conventional electrodialysis applications, moderate selectivity membranes against a very high background of impurities results in excessive current and energy requirements to move the impurity ions along with lithium.

To address the shortcomings of the conventional approach as well as the newer approaches, systems and methods are needed that can eliminate or minimize lithium co-precipitation losses. Such systems and methods should ideally only require treatment of a small portion of the original brine, thus improving the economics of lithium production in a socio-environmentally sustainable fashion.

SUMMARY OF INVENTION

We have found that conventional extraction of lithium from brines results in significant losses of lithium in the evaporation stages due to adhering brine losses with undesirable precipitated salts and as lithium co-precipitation losses. For example, when a salt such as NaCl precipitates early in the process, it must be harvested and removed from the ponds to keep the ponds available for further incoming brine. The harvested NaCl solid is not completely dry and there is adhering liquid with it. This liquid has the same chemistry as the brine in the pond and as such also contains lithium. This lithium is hence lost. These types of losses are referred to as adhering brine losses. Co-precipitation losses are when a lithium salt solid precipitates as itself or as a double salt with other cations and anions. This is the co-precipitation loss. Lithium co-precipitation losses from such processes can be as large as 40-60%, depending on the specific process and brine chemistry.

The systems and methods described herein can eliminate the lithium co-precipitation losses by application of a separator at a specific location(s) in the evaporation sequence.

Applications of the systems and methods provided herein can be seamlessly incorporated into existing operations or be utilized as design features in new operations. Advantageously, the preferred systems and methods require treatment of as little as 1-5% of the total brine flow, require low energy and fresh-water input, increase lithium recovery by absolute 40-70%, and thus greatly reduce lithium extraction costs and environmental impact.

In one embodiment, the present disclosure provides a system for efficiently extracting lithium from brines by reducing lithium losses due to co-precipitation and/or allowing significantly higher lithium concentration. The preferred system includes a sequence of two or more solar evaporation ponds configured to allow evaporation of brine to occur in each pond and for brine to flow from a first pond to one or more other ponds in the sequence; and a conduit configured to remove at least a portion of the brine at a brine removal location and transmit the removed brine to a separator whereby one or more impurities are separated from lithium to form a high impurity stream (i.e., the impure stream) and a low impurity stream (i.e., the pure stream). The high impurity stream is optionally recycled to the sequence of evaporation ponds at a location the same as or upstream from the brine removal location and the low impurity stream is fed to one or more of the removal location, to a subsequent pond in the sequence, or to a lithium plant or concentration facility. The brine removal location is positioned such that lithium co-precipitation together with the one or more impurities is reduced as compared to an amount of lithium co-precipitation that would occur in the preceding or succeeding ponds in the absence of the separation system. As a result, lithium loss due to co-precipitation is reduced or eliminated. It will be understood that the low impurity stream may have a higher or lower concentration of lithium than the high impurity stream but will have a lower concentration of the one or more impurities that are selected for separation from lithium in the separator. By "impurities" herein, we mean components such as $Na^+$, $K^+$, $Mg^{2+}$, $Ca^{2+}$, $Cl^-$, $SO_4^{2-}$, B (ionic or molecular) and other ions (i.e., "impurity ions") or components that, unless separated and/or removed, can form co-precipitates with lithium.

In one case the present disclosure provides a system wherein feed to a first pond in the sequence of ponds is a high lithium, low sulfate brine (e.g., Chilean-type) brine. In a preferred embodiment of this case, the high impurity stream is recycled to a pond precipitating a salt selected from the group consisting of bischofite and carnallite and the low impurity stream is fed to a pond that is substantially free of co-precipitated Li in the form of lithium carnallite.

In another case, the present disclosure provides a system wherein feed to a first pond in the sequence of ponds is a low lithium, high magnesium, high sulfate (e.g., Bolivian-type) brine. In a preferred embodiment of this case, the high impurity stream is recycled to a pond precipitating a salt selected from the group consisting of bischofite, carnallite, hexahydrite and kieserite, and the low impurity stream is fed to a pond that is substantially free of co-precipitated Li in the form of lithium sulfate monohydrate.

In another case the feed to a first pond in the sequence of ponds is a low lithium, low magnesium, high sulfate (e.g., Argentinian-type) brine. In a preferred embodiment of this case, the high impurity stream is recycled to a pond precipitating a salt selected from the group consisting of NaCl and Glauber's salt, and the low impurity stream is fed to a pond that is substantially free of co-precipitated Li in the form of lithium potassium double salt or lithium schoenite.

In any of the embodiments in the preceding paragraphs, the high impurity stream is evaporated in a separate pond sacrificing the contained lithium or harvesting precipitated lithium salt for further processing. The high impurity stream could also be reinjected to the aquifer. The low impurity stream can be processed as described in the previous three paragraphs or taken directly to precipitation or downstream processing plant either together with the concentrated brine or separately from it.

In one aspect of the systems and methods herein the portion of brine removed at the brine removal location is about 1 to about 50%, 1 to 25% and preferably 1 to 5% of the total brine flow in the ponds. In another aspect, the increase in lithium recovery is from about 10 to about 70% (absolute units).

In another aspect of the systems and methods herein, the lithium containing brine is pre-concentrated by solar evaporation to a point at the brine removal location at which further concentration would co-precipitate lithium salts. Preferably, the separator is configured to at least partially separate lithium from impurity cations and anions which have a propensity to form lithium salts that can precipitate under further brine concentration, and which impurity cations and anions are suitable for earlier precipitation with each other in preceding evaporation ponds in the sequence. The separation may be, for example, selected from the group consisting of a selective ion separation membrane, nanofiltration, ion sorption, ion exchange, and electrodialysis. A particularly preferred separator is a LiTAS™ selective ion separation membrane. The membrane separator can be operated in a dialysis or electrodialysis mode.

In another embodiment, the present disclosure provides a system further including removal of borate ions or boric acid in the separation process and recycling and precipitating borate ions or boric acid in previous ponds in the sequence as calcium borate or boric acid, thereby eliminating or substantially reducing a potential requirement for further boron treatment.

In another aspect, the systems provide for recycle of the high impurity stream to a point in one or more preceding evaporation ponds in the sequence where conditions are favorable for precipitation and thus removal of one or more impurity ions without lithium co-precipitation. In another aspect, the systems provide for advancing the low impurity stream to a downstream pond, mechanical evaporator, or precipitation plant for further concentration. This further concentration can now occur substantially without lithium co-precipitation and the associated lithium loss.

In another aspect, the systems provide for the high impurity stream diverted to a separate pond for evaporation or re-injection into the aquifer. Precipitated salts containing lithium could be processed together or separately with the brine in the processing plant. In another aspect, the systems provide for advancing the low impurity stream directly to the downstream processing plant.

In a further embodiment, the present disclosure provides a method for improving efficiency in extracting lithium from brines using a sequence of solar evaporation ponds, by reducing lithium losses due to co-precipitation, the method including separating at least a portion of the brine at a brine removal location to obtain a removed brine, and transmitting the removed brine through a separator such that one or more impurities are separated from lithium to form a high impurity stream (i.e., the impure stream) and a low impurity stream (i.e., the pure stream). The method can next recycle at least a portion of the high impurity stream to the sequence of evaporation ponds at a location the same as or upstream from the brine removal location, and transfer the low impurity stream to one or more of the removal location (i.e., the pond from which the brine was removed), to a downstream (i.e., subsequent) pond in the sequence, or to a lithium recovery facility. The brine removal location is positioned such that lithium co-precipitation with one or more impurities is reduced from the brine flow and higher concentration of lithium is attained due to lithium co-precipitation reduction or elimination. The method may include further concentrating the low impurity stream by, such as, evaporation without co-precipitation loss of lithium even at higher concentrations.

In one aspect, the method of separating is conducted via a selective monovalent-multivalent and/or a monovalent-monovalent ion separation system. Preferably, the separator comprises a LiTAS™ Technology Membrane. The membrane may be operated in a dialysis or electrodialysis mode.

In other aspects, the method of separating is conducted via a solvent extraction, ion exchange or ion adsorption technique to selectively separate lithium from impurity ions.

In one aspect, the method can attain an increase in lithium concentration in a range from about 50% to about 400%.

These and other embodiments are illustrated herein below and described in the appended claims.

BRIEF DESCRIPTION OF FIGURES

FIG. 2 (a) represents typical Chilean and Bolivian brines, (b) typical Argentinian brines, and (c) typical Bolivian and some Argentinian brines.

FIG. 7 depicts a mass balance and simulation results of the brine evaporation process of FIG. 6 using preferred aspects of the present disclosure.

FIG. 8 depicts a mass balance and simulation results of another conventional brine (Bolivian Brine, Low Lithium, High Magnesium, High Sulfate) evaporation process for production of lithium.

FIG. 9 depicts a mass balance and simulation results of the brine evaporation process of FIG. 8 using preferred aspects of the present disclosure.

FIG. 10 depicts a mass balance and simulation results of another conventional brine (Argentinian Brine, Low Lithium, Low Magnesium, High Sulfate) evaporation process.

DETAILED DESCRIPTION OF PREFERRED EMBODIMENTS

The systems and methods described herein advantageously eliminate or minimize lithium co-precipitation losses by application of a separator, preferably a selective monovalent-multivalent and/or a selective monovalent-monovalent separation process applied at a selected location in the evaporation cycle.

In general, the methods comprise one or more of the following steps: solar evaporation to preconcentrate the brine to the point of lithium saturation; apply selective separation to separate lithium from the impurities at a selected location (preferably, a point such that lithium would otherwise reach saturation and co-precipitation with impurity ions); return separated impurities to a location in the evaporation sequence where conditions are favorable for their precipitation; and then further concentrate lithium by, such as evaporation, as the accompanying impurities do not favor lithium co-precipitation.

Figure 1:
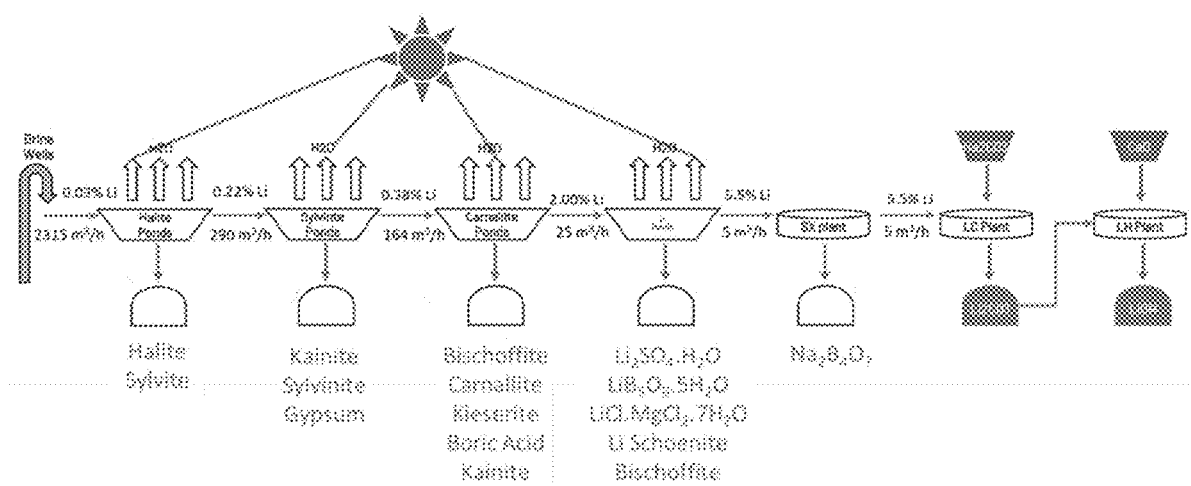
FIG. 1 (prior art) illustrates typical solar evaporation and concentration of lithium from brines as well as precipitations of salts at different points in the evaporation sequence. Lithium precipitation losses in such systems can be in the 40-60% range.

With reference to solar evaporation, to preconcentrate the brine to the point of lithium saturation, in addition to the use of solar energy for evaporation, the resulting salt precipitations are effective methods for removing undesirable impurities from the brine while concentrating the brine's lithium content. This naturally occurring process is superior to most energy intensive mechanical separations. The rejections of undesirable impurities from solar evaporation are shown in Table 2. Hence, instead of attempting to mechanically separate these impurities from the as-pumped brine, in one embodiment natural evaporation-concentration-precipitation processes are allowed to occur to, at, or near the point of lithium saturation, the "saturation point." For example, this point may be reached after the carnallite/bischofite pond as shown in FIG. 1, or earlier with saturation of lithium sulfate monohydrate ($Li_2SO_4 \cdot H_2O$). Evaporation beyond the lithium saturation point will start lithium co-precipitation and losses. Application of the systems and methods described herein after natural solar evaporation can reduce the overall volume of brine to be treated by 95-99%.

With reference to selection of advantageous location(s) for separation of lithium from impurities, we have found that the location depends on which lithium salts precipitate at what point in the evaporation sequence and also the conditions prior to this point of lithium precipitation which are favorable for precipitating other salts. Selection of locations for application of separation can also be viewed as a location for removal of a portion of the brine stream from the sequence of evaporation ponds. This location is preferably a point at which the concentration of lithium is within a range of minus 50%, minus 25%, preferably plus or minus 10%, or up to plus 50% of its saturation concentration in the brine. This point also reflects a potential limit on the location of recycle for return of impurities to the existing ponds where conditions are favorable for their precipitation and removal. The recycle location can be at the location for removal (e.g., the same pond from which removal occurred) of at least a portion of the brine stream or can be upstream of this location where conditions are favorable for precipitation of impurities without lithium co-precipitation, or a separate pond for partial or total evaporation or re-injected to the aquifer. Such recycle and precipitation of the impurities prevents them from building up in the system and altering the chemistry in the evaporation ponds.

Table 2. Rejection of Ion Impurities by Natural Evaporation and Precipitation in Solar Evaporation Processes.

| Ion | Rejection (%) |
|---|---|
| $Na^+$ | 99.5% |
| $K^+$ | 99.5% |
| $Mg^{2+}$ | 50% |
| $Ca^{2+}$ | 50% |
| B (ionic) | 50% |
| $Cl^-$ | 80% |
| $SO_4^{2-}$ | 95% |

Figure 2:
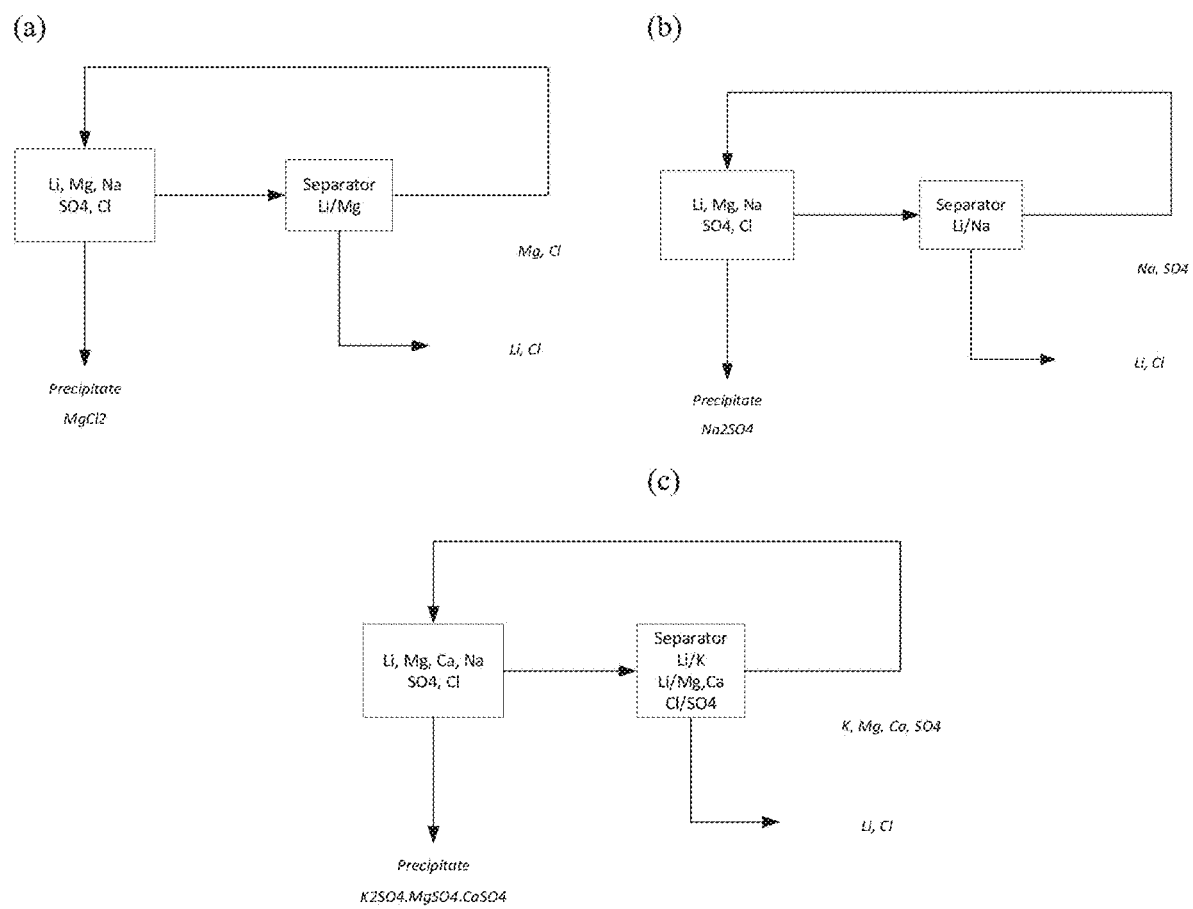
FIG. 2 illustrates embodiments of the present disclosure using separator applications in the evaporation pond cascade to exploit natural brine chemistry for removal of impurities and concentration of lithium without lithium co-precipitation losses.

By way of illustration, three scenarios are shown in FIG. 2. FIG. 2a depicts a brine in which continued evaporation results in lithium co-precipitation as $LiCl \cdot MgCl_2 \cdot 7H_2O$. The previous pond in the evaporative sequence however has conditions favorable for, and thus is precipitating, $MgCl_2 \cdot 6H_2O$. This is a very typical situation in Chilean and Bolivian brines as well as other high magnesium brines. Using aspects of the presently disclosed systems and methods $Mg^{2+}$ is prevented from advancing forward; we have found that lithium co-precipitation as $LiCl \cdot MgCl2 \cdot 7H2O$ will thus be prevented. Magnesium can be prevented from advancing by utilizing, for example, a suitable monovalent-divalent ($Li^+/Mg^{2+}$) cation selective separator. The blocked $Mg^{2+}$ may then be recycled to the previous pond(s) where conditions remain favorable for its precipitation as $MgCl_2 \cdot 6H_2O$. The lithium passing the separator and advancing now does not have magnesium to co-precipitate and hence can be concentrated to much higher levels without incurring any lithium losses.

In the scenario of FIG. 2b, the brine is typical of Argentinian and Bolivian brines as well as other high sulfate brines, wherein the concentration of Li results in precipitation of $Li_2SO_4 \cdot H_2O$. The previous pond is favorable for precipitating $Na_2SO_4 \cdot 10H_2O$. Using aspects of the presently disclosed systems and methods, separator blocks $SO_4^{2-}$ from advancing, $Li_2SO_4 \cdot H_2O$ will not precipitate in subsequent evaporation. To block the $SO_4^{2-}$ anion, in an embodiment of the present systems and methods an equivalent amount of cation also is blocked, to maintain electroneutrality. $Na^+$ is preferred cation to block, as it is favored for precipitation in the previous pond to which, preferably, it is recycled. The blocked $Na^+$ and $SO_4^{2-}$ are thus recycled back to the previous pond where they are precipitated as additional $Na_2SO_4 \cdot 10H_2O$. $Na^+$ and $SO_4^{2-}$ can be blocked by a suitable monovalent-monovalent (Li—Na) cationic separator and a monovalent-divalent anionic separator ($Cl^-$—$SO_4^{2-}$).

In FIG. 2c, as is typical of some Argentinian brines, further concentration of lithium leads to lithium schoenite ($Li_2SO_4 \cdot K2SO_4$) precipitation. The previous pond precipitated $K_2SO_4 \cdot MgSO_4 \cdot CaSO_4$. Hence, a monovalent-monovalent separation between $Li^+$ and $K^+$ (which is also effective between $Li^+$ and $Mg^{2+}$, $Li^+$ and $Ca^{2+}$, and, $SO_4^{2-}$ and $Cl^-$) prevents the excess $K^+$ and $SO_4^{2-}$ from advancing and thus prevents lithium schoenite precipitation. The blocked ions are recycled to previous ponds in the sequence having conditions favorable for precipitation as $K_2SO_4 \cdot MgSO_4 \cdot CaSO_4$ and are thus removed from the system by solar evaporation and natural precipitation. In FIG. 2 the recycle is to the previous pond. In other aspects of this disclosure the recycle is alternatively to the first pond in the sequence where conditions are also favorable for precipitating, for example, sulfate as sodium sulfate decahydrate. Prior to application of the methods taught herein, the impurity ions co-precipitated with Li, resulting in significant Li losses.

As illustrated in FIG. 2, various embodiments of separator applications at particular locations in the sequence of evaporation ponds exploit natural brine chemistry for removal of impurities and concentration of lithium without lithium co-precipitation losses.

In addition, in all the cases an optional separator configured to block the borate anion from advancing and thus recycling it back to the previous ponds where conditions are favorable for precipitation of calcium or sodium borate or boric acid also is beneficial. Conventionally, boron is removed from the concentrated brine by expensive and environmentally undesirable methods, such as solvent extraction using organic solvents.

If however the pH is acidic, as it is in all cases with such brines and electrodialysis is used as the separation device, boron existing as molecular boric acid follow water and is essentially retained with the impurity rich stream and precipitated in the preceeding ponds. This alleviates the necessity of the boron removal step in or in between the evaporation ponds and the processing plant.

Similarly, any solvent extraction, ion exchange or ion sorption process that retains boron with the impurity rich stream will benefit from this approach as described in the preceding paragraph.

Figure 3:
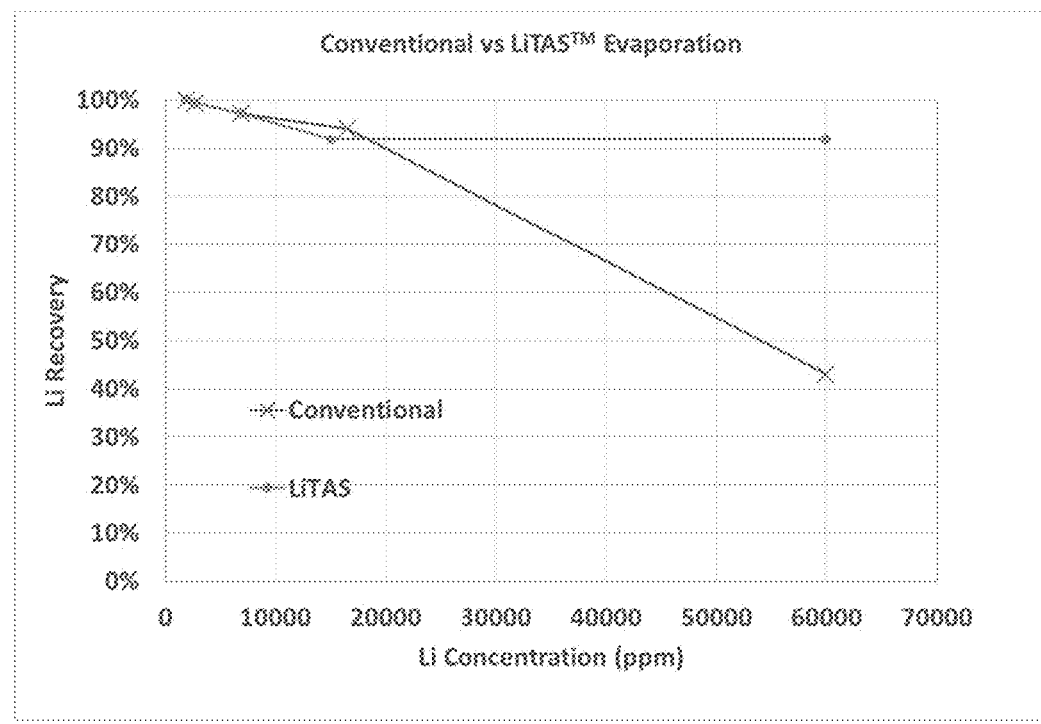
FIG. 3 illustrates increases in Li recovery using aspects of the presently disclosed methods and systems while attaining high lithium concentrations from a typical Bolivian brine.

As shown in FIG. 3, increase in recovery achieved while reaching high Li concentrations for a Chilean brine with application of a LiTAS™ membrane separator.

By references to "Chilean-type," "Bolivian-type", and "Argentinian-type" brines herein, we mean brines having the ratios of components as shown in Table 3, plus or minus 50%, plus or minus 30%, or preferably plus or minus 15% of the following ratios.

Table 3. Classification of Lithium Containing Brines into Types Based on Ratio of Key Components.

| Brine Type | $Mg^+/Li^+$ Ratio | $SO_4^{2-}/Li^+$ Ratio |
|---|---|---|
| Chilean | 3-10 | 0.1-10 |
| Bolivian | 12-50 | 20-50 |
| Argentinian | 1-8 | 10-40 |

Figure 4:
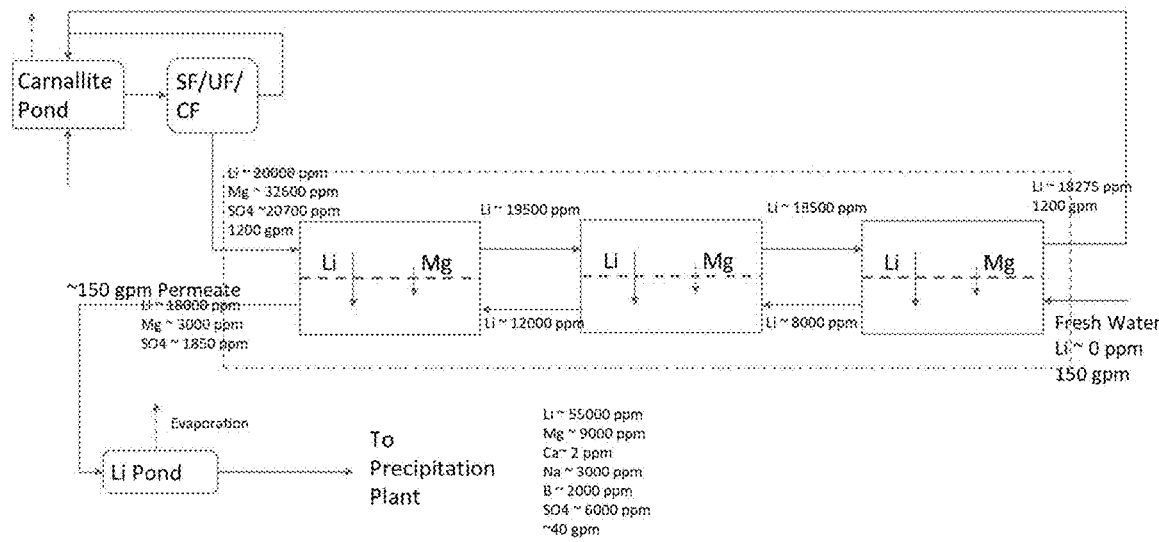
FIG. 4 shows aspects of a preferred embodiment using ion separation after carnallite/bischofite ponds from a typical Chilean or Bolivian brine.

It should be understood that separators useful in embodiments of the present disclosure can include any separators which can achieve separation of at least a portion of lithium from one or more impurities in the brine, and preferably targeted monovalent-monovalent and/or monovalent-multivalent separations. Examples of suitable separators utilize nanofiltration, ion sorption, or ion exchange, with preferred embodiments utilizing LiTAS™ membrane separation technology as shown in FIG. 4. By "LiTAS™" membrane separation technology, we mean lithium-ion transport and/or separation using metal organic framework (MOF) nanoparticles. MOFs have exceptionally high internal surface area and adjustable apertures that achieve separation and transport of ions while only allowing certain ions to pass through. These MOF nanoparticles are materialized like a powder, but when combined with polymer to create a tangible product, utilizing a proprietary processing method, the combined MOF and polymer create a mixed matrix membrane embedded with the nanoparticles. The MOF particles create a percolation network, or channels, that allow selected ions to pass through. When extracting lithium, the membrane is placed in a module housing. Brine is pumped through the system with one or more layers of membranes that conduct effective separation even at high salinities. While current separator technology can fall short in one area or another, LiTAS™ is particularly preferred and effective. LiTAS™ Membrane Technology U.S. Patent Application No. 62/892,439, filed Aug. 27, 2019, U.S. Patent Application No. 62/892,440, filed Aug. 27, 2019, and International Patent WO Publication Number 2019/113649A1, published Jun. 20, 2019, are hereby incorporated by reference in their entireties.

Dialysis mode is suitable for ionic separation subsystems herein as very low energy costs are incurred as the transfer of ions through the membranes relies on concentration driving forces rather than electrical or pressure driving forces. At the ultra-high salinity of the brine solutions (50-60% Total Dissolved Solids, TDS) osmotic pressures are too large to be overcome by practical or economically feasible means. A reasonable degree of selectivity, particularly monovalent-monovalent cationic selectivity ($Li^+$—$Na^+, K^+$), is also desired along with high throughputs.

In a dialysis mode membrane operation, Li extraction is conducted in a source of fresh water or a low Li-containing water source to maintain a suitable concentration gradient across the membrane. The extractant or sweep fluid may also advantageously constitute return mother liquor from the downstream precipitation plant which is low in lithium and high in Na and Cl. High Na concentration may also enhance monovalent-monovalent selectivity between Li and Na, as the concentration driving force for Na would be lower.

A dialysis approach would slightly reduce the lithium concentration compared to the feed to the separator. This can be overcome by application of electrodialysis to selectively concentrate lithium or by reverse osmosis to reject water. The TDS of the pure stream is around 10% which can allow a small concentration using reverse osmosis before osmotic pressures become too large.

An electrodialysis mode of operation with Li-selective membranes is particularly preferred as fresh water use is minimized, and the process stream can be cleaned and concentrated simultaneously. In addition, molecular boric acid in acidic conditions remains with the impurity stream allowing its simultaneous removal with other impurities rather than needing a separate step for its removal.

Other separation technologies could be the well known solvent extraction, ion exchange or ion sorption where lithium is selectively separated from impurities and boron remains with the impurity concentrated stream.

As illustrated in FIG. 4, a preferred embodiment using impurity ion separation located after carnallite/bischofite ponds and a typical Chilean or Bolivian brine. SF, CF, UF are examples of pre-treatments that can be used on the brine before it enters any separator or LiTAS™ membrane. This also is true for traditional reverse osmosis processes. (SF=Sand Filters, CF=Carbon Filters, UF=Ultrafiltration).

As shown and discussed above, the separators advance lithium forward and recycle the impurities to the preceding ponds. The return location of the impurities is preferred to be the same pond from which the feed to the separator is drawn. This can however also be recycled to earlier stages of evaporation if the chemistry is favorable for ion impurity precipitation is such ponds. The impurities could also be evaporated partially or completely in a separate pond or injected to the aquifer. The lithium advance stream could be concentrated during separation such as with electrodialysis or other separation methods and advance directly to the downstream processing plant.

Figure 5:
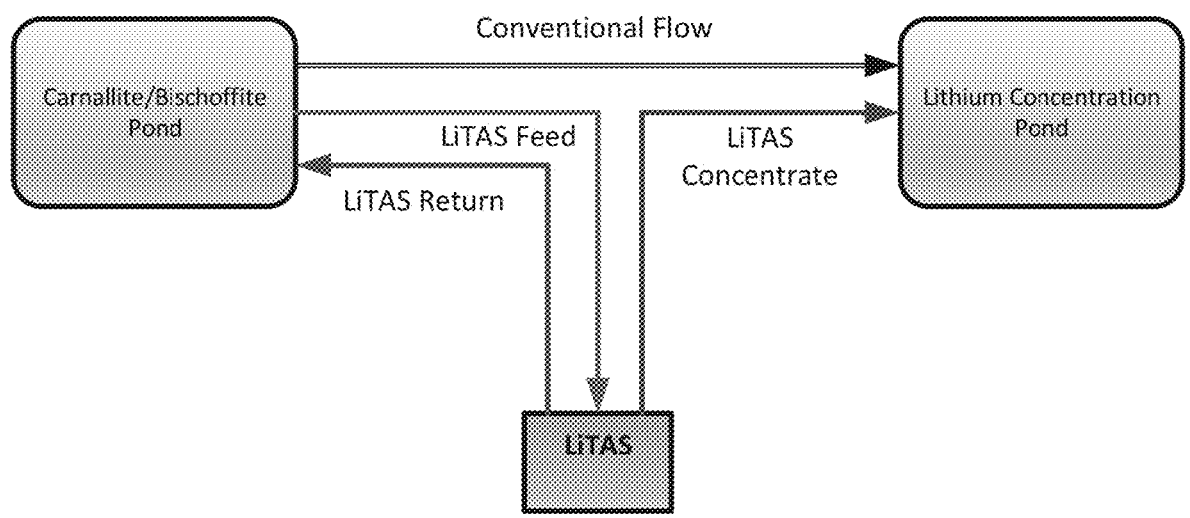
FIG. 5 illustrates an aspect of seamless integration of the presently disclosed systems in an existing operation.

Referring to FIG. 5, the systems and methods taught herein can be integrated seamlessly in existing operations. In conventional processes, the brine advances from one pond to the next in sequence. With this disclosure, the advancing brine instead passes through a separator at a selected location based on brine chemistry and lithium saturation at that point. Part of the brine with reduced impurities then advances to the next pond in the series, and the other part with higher impurities is recycled to the pond feeding the separator or optionally to one or more previous ponds in the sequence. The recycle feed pond precipitates the excess impurities recycled by the separator, thus keeping the advancing brine composition substantially constant.

New ponds and evaporation concentration systems can also be designed to incorporate aspects of the presently disclosed systems and methods in new operations. The impurities-depleted brine from the separator can advance normally to the next pond in the series where lithium concentration can increase significantly without co-precipitation as double salts with impurities.

These and further aspects of the systems and methods are described below in relation to exemplary embodiments which include examples that both illustrate the use of the systems and methods and provide corresponding characterization data relating to ions removed and Li recovery efficiency. Having described currently preferred embodiments of systems and methods, and having shown illustrative details of particular embodiments, it will be understood that the specific examples given below are employed in a descriptive sense only and are not for the purpose of limitation. Various modifications to the embodiments may be made without departing from the spirit and scope of the present invention which is limited only by the appended claims.

EXAMPLES

The currently preferred systems and methods were modelled using simulation software through the entire evaporation sequence of the ponds. An Extended UNIQUAC thermodynamic modelling approach was used to predict thermodynamic equilibrium. This model has been validated previously in lithium and non-lithium aqueous chemistry applications from a variety of sources. The model provided brine compositions through the progressive evaporation stages precipitating different phases of salts. Modelling was conducted at a steady state at a fixed temperature of either 5° C. (Argentinian type brines) or 10° C. (Chilean and Bolivian type brines).

As evaporation proceeds, the first salt to precipitate is halite followed by sylvinite (mixture of halite and sylvite), kainite, calcium borate and gypsum. Further evaporation precipitates carnallite, bischofite, kainite, sylvinite, gypsum, kieserite and boric acid. The precipitation of salts varies and is dependent on the starting brine compositions and evaporation conditions. This proceeds until a lithium concentration of about 0.5-2% is reached. Further evaporation from this level starts precipitation of lithium sulfate monohydrate, lithium carnallite or lithium schoenite, again dependent on the brine composition, potentially resulting in significant lithium losses from prior systems.

Equilibrium concentrations of all ionic species were obtained from the thermodynamic model and used in a mass balance simulation. The equilibrium concentrations controlled the precipitation of different salts in this model and advanced the brine from one stage to the next. Separator selectivities as shown in Table 3 were programmed into the model to generate pure and impure streams from the separator. In Examples A and B, the impure stream was returned to the pond from which the separator feed was drawn. In Example C, the impure stream was returned to the first pond in the evaporation sequence. The model was iterated until a steady state was obtained in the ponds and the separator. Under the new steady-state brine chemistry of the ponds, equilibrium parameters were recalculated and the model re-iterated. The pure stream from the separator was concentrated in the next pond in a similar fashion. The result was a full profile of brine and precipitated solids compositions and flow across the entire evaporation sequence of the Examples.

Table 3. Exemplary LiTAS™ Separator Ionic Selectivity Ratios, Used for Modelling Separator Performance in Lithium Brine Evaporation Pond Sequences in Examples A and B. Example A is a Single Stage Separation while Example B Utilizes Two Stage Separation.

| Ion | Selectivity Ratio Example A | Selectivity Ratio (per stage)/B Recovery Example B |
|---|---|---|
| $Li^+:Na^+$ | 1.25 | 1 |
| $Li^+:K^+$ | 1.1 | 1 |
| $Li^+:Mg^{2+}$ | 10 | 100 |
| $Li^+:Ca^{2+}$ | 10 | 100 |
| $Li^+:B$ (ionic) | 1.25 | 5% Recovery |

These simulations were conducted for three known brine sources from Chile, Bolivia and Argentina. Single pass transfer to the pure stream was set at 10% in Examples A, 90% in Example B and 84% for Example C. Example B also utilized a two stage separation where the lithium rich stream after the first stage undergoes another separation step to further clean that stream in a second stage. Example A represents monovalent selective membrane dialysis, Example B monovalent selective membrane electrodialysis and Example C a lithium selective membrane dialysis process. These variations between the examples have been shown to demonstrate the applicability of the method taught here to any such appropriate technology or separation. Results are presented in the three examples below. Simulations were conducted both for the conventional brine evaporation process and the process incorporating a preferred system and method as taught in this disclosure. Simulation results of Examples A and C represent existing or proposed operations. The results for the conventional process as practiced match closely with actual operations. This also confirms the validity of our modelling and simulation approach for these and other applications and examples.

Example A: Chilean Brine (High Li, Low Sulfate)

Figure 6:
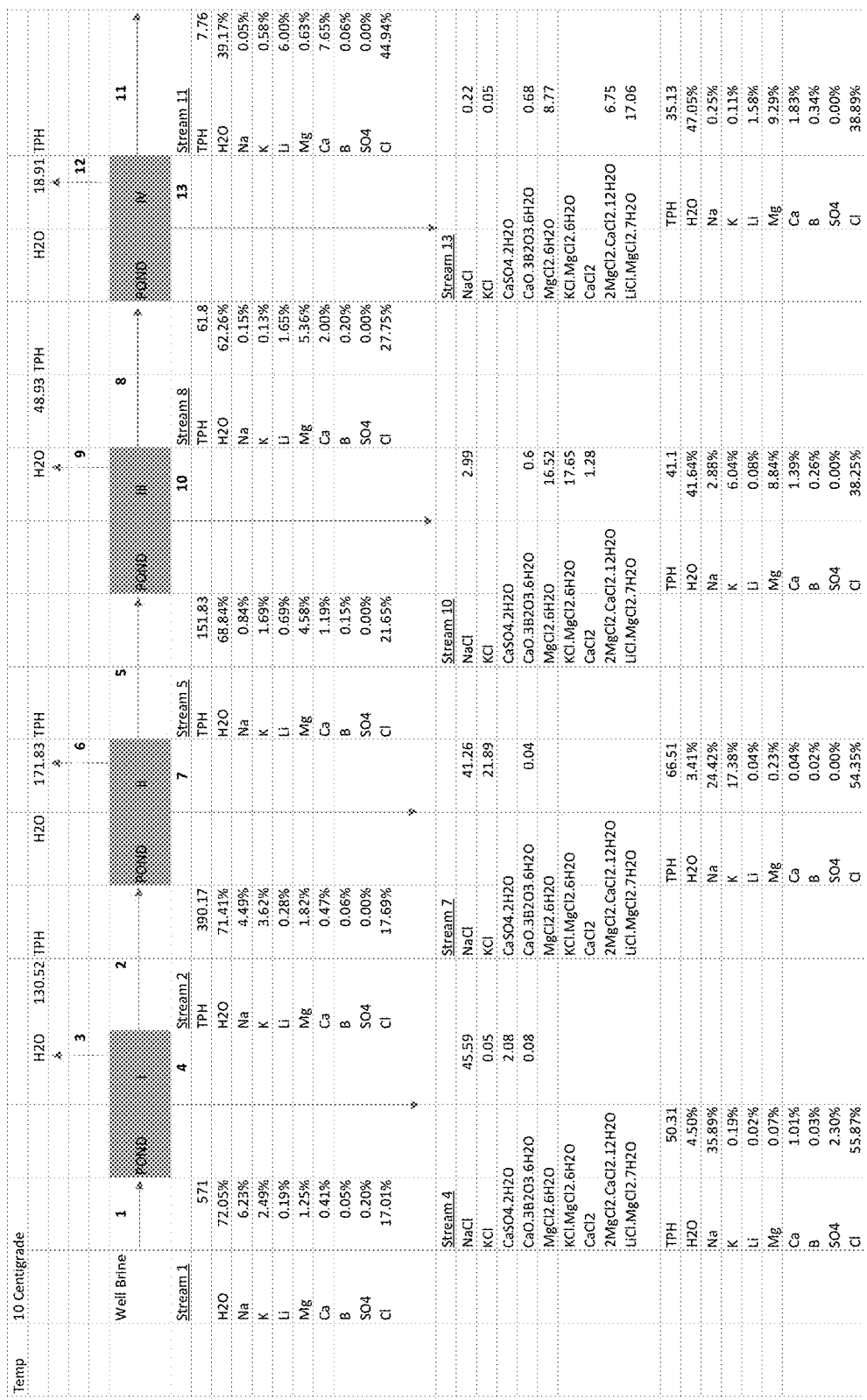
FIG. 6 depicts a mass balance and simulation results of the conventional brine (Chilean Brine High Lithium, Low Sulfate) evaporation process for production of lithium.

FIG. 6 represents the conventional brine evaporation process simplified to four pond stages. The starting brine composition is indicated by Stream 1 composition and the final concentrated brine by Stream 11 compositions. All streams are numbered and the flow rates in tons per hour are indicated. The salt species precipitating in each pond are also indicated with their amounts in tons per hour.

As seen in this example, the starting lithium brine concentration is high at 0.19%. The Mg/Li ratio is moderately low at 6.6. Sulfate is low at 0.2%. Upon evaporation in Pond I, the major precipitate is halite (NaCl). Pond II precipitates NaCl and KCl (sylvinite) in major amounts. In Pond III, conditions are favorable for precipitation of magnesium as bischofite ($MgCl_2 \cdot 6H_2O$) and carnallite ($KCl \cdot MgCl_2 \cdot 6H_2O$). These conditions are exploited in this Example to recycle additional magnesium and precipitate the same. Lithium concentration after this pond reaches 1.65%. This point was determined such that any concentration beyond this will result in lithium co-precipitation. As seen, by comparison, further evaporation starts to precipitate lithium and magnesium together as lithium carnallite ($LiCl \cdot MgCl_2 \cdot 7H_2O$) resulting in large lithium losses.

Hence, the point of application for the separator was determined. The separator would be applied after Pond III and before Pond IV as lithium precipitation and losses do not occur in Pond III but start in Pond IV. The co-precipitating element of interest is also now determined to be Mg as lithium co-precipitates with magnesium in Pond IV. A suitable location to remove this magnesium is also now known to be Pond III where conditions are favorable to precipitation of magnesium but not lithium.

As shown in FIG. 6 for Example A, a mass balance and simulation results of the conventional brine evaporation process for production of lithium. Composition numbers do not add to 100% due to rounding and ignoring trace levels of elements.

Figure 7:
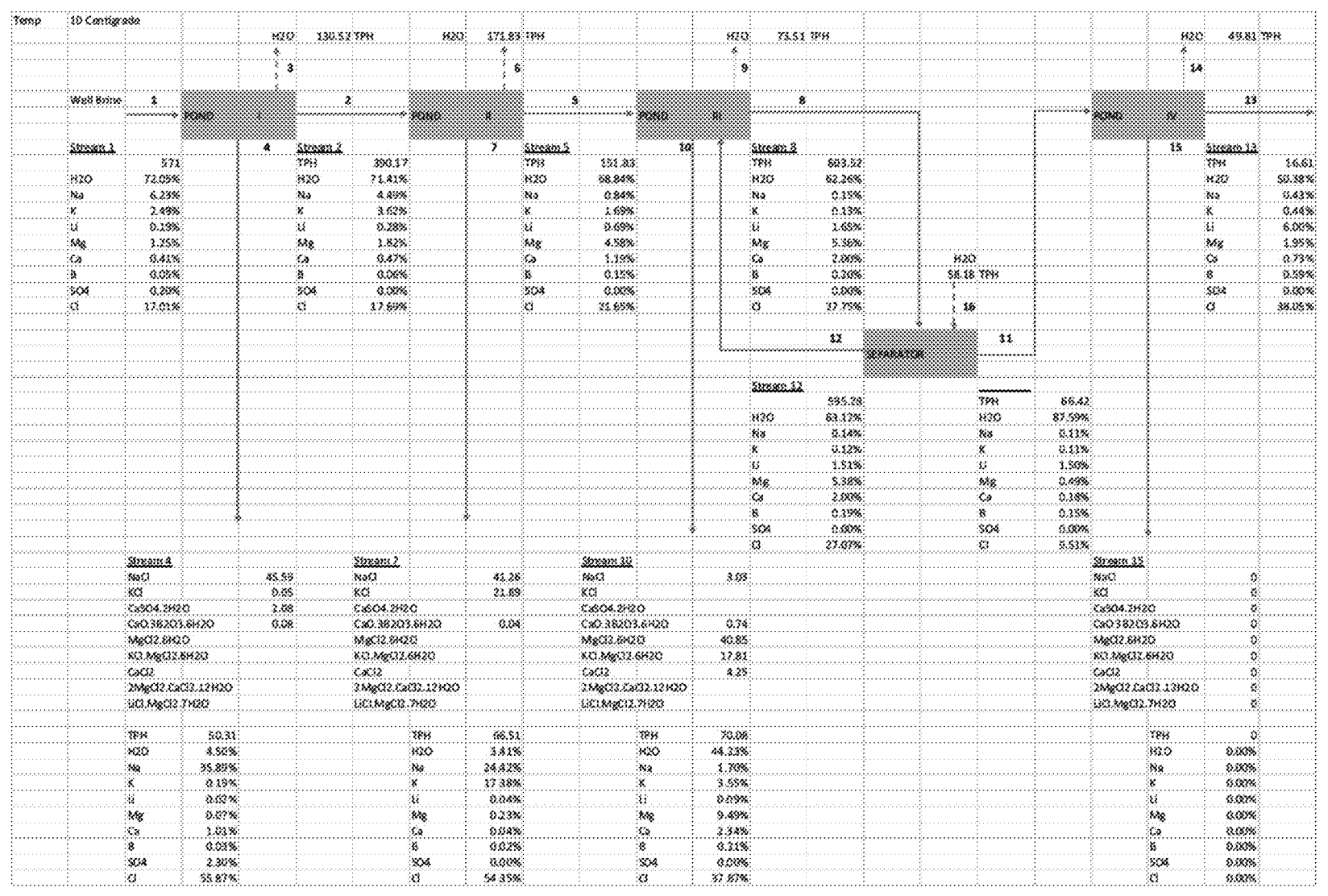

The mass balance and simulation results after application of the separator at the selected location is shown in FIG. 7. The separator takes feed from Pond III. It partially separates lithium from magnesium. The lower magnesium pure stream is advanced to Pond IV for further evaporation and concentration while the higher magnesium impure stream is recycled to Pond III, where the excess incoming magnesium is precipitated and removed.

As shown in FIG. 7 for Example A, a mass balance and simulation results of the brine evaporation process for production of lithium using the invention. Composition numbers do not add to 100% due to rounding and ignoring trace levels of elements.

Comparison of FIGS. 6 and 7 indicates information listed below.
1) The composition of Stream 8 in both cases remains unchanged with the only difference being the flow rate. This is because the composition is determined by the solid-liquid equilibrium conditions in Pond III. The excess magnesium in Stream 12 returning from the separator is removed in the precipitate as additional bischofite.
2) The lithium content in the final concentrated stream with the application of a preferred method according to the present disclosure is more than doubled, as lithium losses do not occur in Pond IV due to now low levels of magnesium there. The lithium concentration then advantageously proceeds from 1.65% to 6% without any lithium precipitation losses in Pond IV.
3) There is no precipitation observed in Pond IV, indicating that lithium concentration can proceed further to the point where lithium precipitation initiates.
4) Stream 16 in FIG. 7 shows any water addition that may be required by the separator operation. It could be zero where the separator does not require it without impacting the method. This additional water, if any, can be evaporated in the preceding pond where the impurity enriched stream is recycled.

Example B: Bolivian Brine (Low Li, High Magnesium, High Sulfate)

FIG. 8 represents the conventional brine evaporation process simplified to four pond stages for a Bolivian brine.

The starting brine composition is indicated by Stream 1 composition, and the final concentrated brine by Stream 11 composition. All streams are numbered and the flow rates in tons per hour are indicated. The salt species precipitating in each pond are also indicated with their amounts in tons per hour.

As seen in this example, the starting lithium brine concentration is very low at 0.07%. The Mg/Li ratio is very high at 19. Sulfate/Li ratio is also very high at 29. Upon evaporation in Pond I, the major precipitate is halite (NaCl) and polyhalite ($K_2SO_4 \cdot MgSO_4 \cdot 2CaSO_4 \cdot 2H_2O$). Pond II precipitates NaCl+KCl (Sylvinite) and minor amounts of polyhalite. In Pond III, halite, sylvinite, kainite ($KCl \cdot MgSO_4 \cdot 3H_2O$) and carnallite ($KCl \cdot MgCl_2 \cdot 6H_2O$) precipitate. Here, Li concentration reaches 0.49%. Further evaporation in Pond IV starts lithium sulfate monohydrate precipitation along with increasing amounts of carnallite and other salts.

The preferred point of application for the separator is thus selected. The separator would be applied after Pond III and before Pond IV as lithium precipitation and losses do not occur in Pond III but start in Pond IV. The co-precipitating ion of interest is also now determined to be sulfate as lithium precipitates as $Li_2SO_4 \cdot H_2O$ in Pond IV. The separation used here grossly separates all impurities from Li. A suitable location to remove this sulfate ion is also now known to be Pond III as it is already precipitating Mg, K and sulfate as carnallite and kainite and boric acid, but not lithium. Magnesium is the counter-ion to sulfate that is selected in this Example as sulfate precipitates with magnesium in the preceding ponds.

Figure 9:
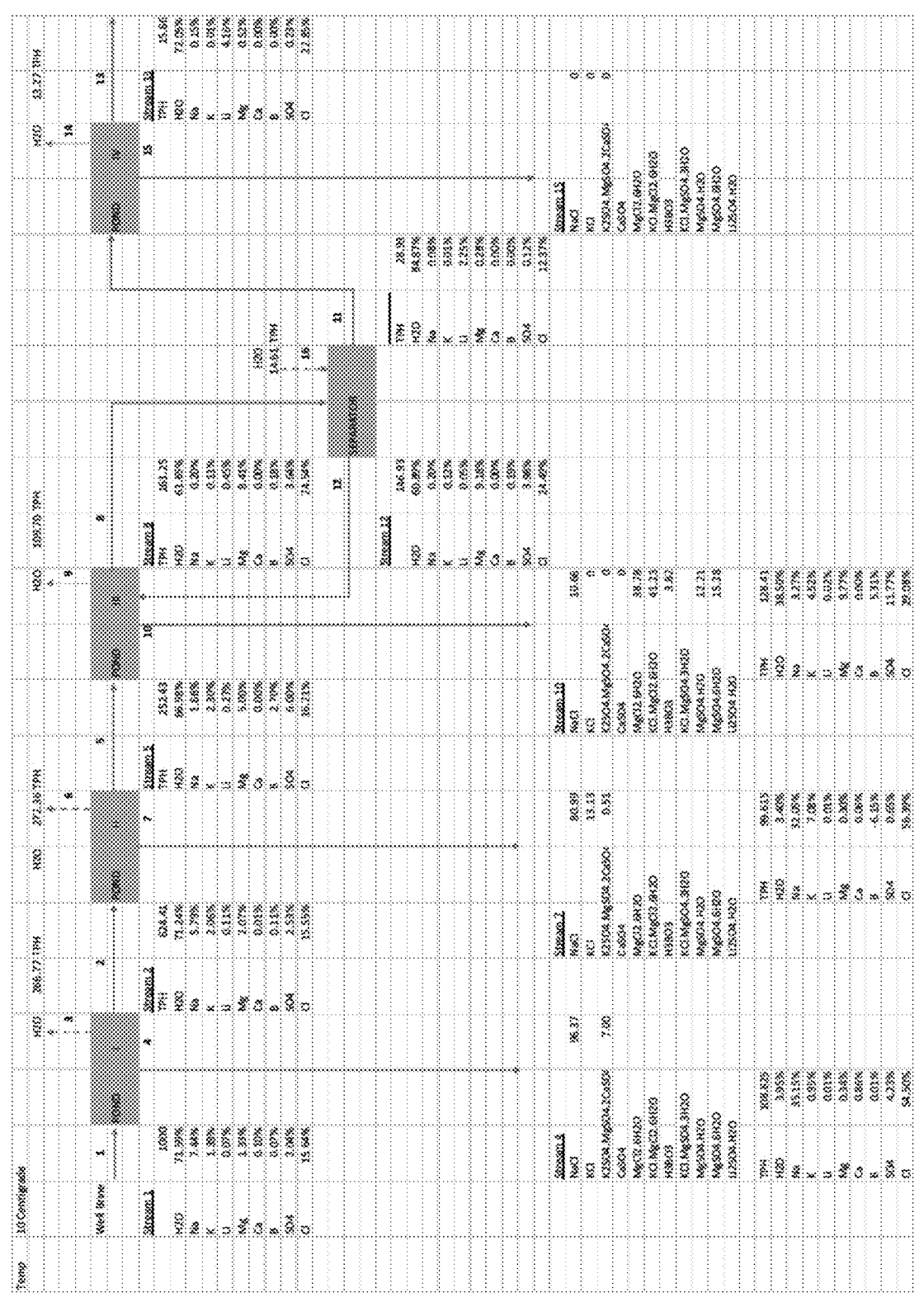

Simulation and modeling of this new flowsheet as shown in FIG. 9 indicates that all recirculating impurities, mainly Mg, sulfate and boric acid are precipitated in Pond III. The recirculation and the change in concentration changes the form in which they precipitate. In addition to carnallite and boric acid, magnesium and sulfate now precipitate as kieserite ($MgSO_4 \cdot H_2O$) and hexahydrite ($MgSO_4 \cdot 6H_2O$).

With the application of the preferred method, the recoverable lithium would almost quadruple as seen by comparing Streams 13 in FIGS. 8 and 9. Note that this current operation harvests the precipitated lithium sulfate monohydrate as feed to the processing plant (FIG. 8, Stream 13). The Li-rich advancing stream (FIG. 9, Stream 11) is now much lower in impurities compared to the Pond III overflow from the base case flowsheet (FIG. 8, Stream 8). This allows further evaporative concentration of FIG. 9, Stream 11 to nearly 4.2% Li concentration without any precipitation of any salt. This is a 10 fold increase in Li concentration compared to the base case (FIG. 8) without incurring any Li loss. Simulation and modeling indicates that concentration beyond 4.2% Li in this case will again result in initiation of lithium sulfate monohydrate precipitation.

As shown in FIG. 9 for Example B, a mass balance and simulation results of the brine evaporation process for production of lithium using the invention. Composition numbers do not add to 100% due to rounding and ignoring trace levels of elements.

Example C: Argentinian Brine (Low Li, Low Magnesium, High Sulfate)

The brines in this Example are Argentinian type brines which are characterized by low Li and Mg contents but high sulfate. FIG. 10 represents the conventional brine evaporation process simplified to four pond stages. The starting brine composition is indicated by Stream 1 composition and the final concentrated brine by Stream 11 composition.

As seen in this Example, the starting lithium brine concentration is very low at 0.07%. The Mg/Li ratio is also very low at ~3. Sulfate/Li ratio is however very high at 20. Upon evaporation in Pond I, the major precipitate is halite (NaCl) along with Glauber's salt ($Na_2SO_4 \cdot 10H_2O$). Pond II continues to precipitate halite. Pond III precipitates halite and sylvite (Sylvinite, NaCl+KCl). These ponds also precipitate minor amounts of syngenite ($K_2SO_4 \cdot CaSO_4 \cdot H_2O$). Hence it can be seen that the major sink to remove the high levels of sulfate in this brine type is in Pond I.

Pond III reaches a lithium concentration of 0.69%. Further concentration beyond this in Pond IV results in lithium co-precipitation losses as lithium potassium double salt (lithium schoenite, $Li_2SO_4 \cdot K_2SO_4$). Hence, the selected location for the separator application would be after Pond III. It is also now determined that reducing sulfate levels along with an associated counter-ion such as K or Na would prevent lithium co-precipitation losses in Pond IV. A suitable sink for sulfate was already determined to be Pond I. Hence, recirculating the impure sulfate concentrated stream from the separator to Pond I, would remove the excess sulfate. A separator was modelled at the selected location, achieving monovalent-monovalent and monovalent-multivalent separation with selectivities as shown in Table 4.

As shown in FIG. 10 for Example C, a mass balance and simulation results of the conventional brine evaporation process for production of lithium. Composition numbers do not add to 100% due to rounding and ignoring trace levels of elements.

Table 4. Separator Ionic Selectivity Ratios Used for Modelling Monovalent-Monovalent and Monovalent-Multivalent Separator Performance in Lithium Brine Evaporation Pond Sequence of Example C.

| Ion | Selectivity Ratio |
|---|---|
| $Li^+:Na^+$ | 4.4 |
| $Li^+:K^+$ | 6.3 |
| $Li^+:Mg^{2+}$ | 10.6 |
| $Li^+:Ca^{2+}$ | 20.0 |
| $Li^+:Cl^-$ | 2.8 |
| $Li^+:SO_4^{2-}$ | 11.3 |
| $Cl^-:SO_4^{2-}$ | 4.0 |
| $Li^+:B$ (ionic) | 4.0 |

Figure 11:
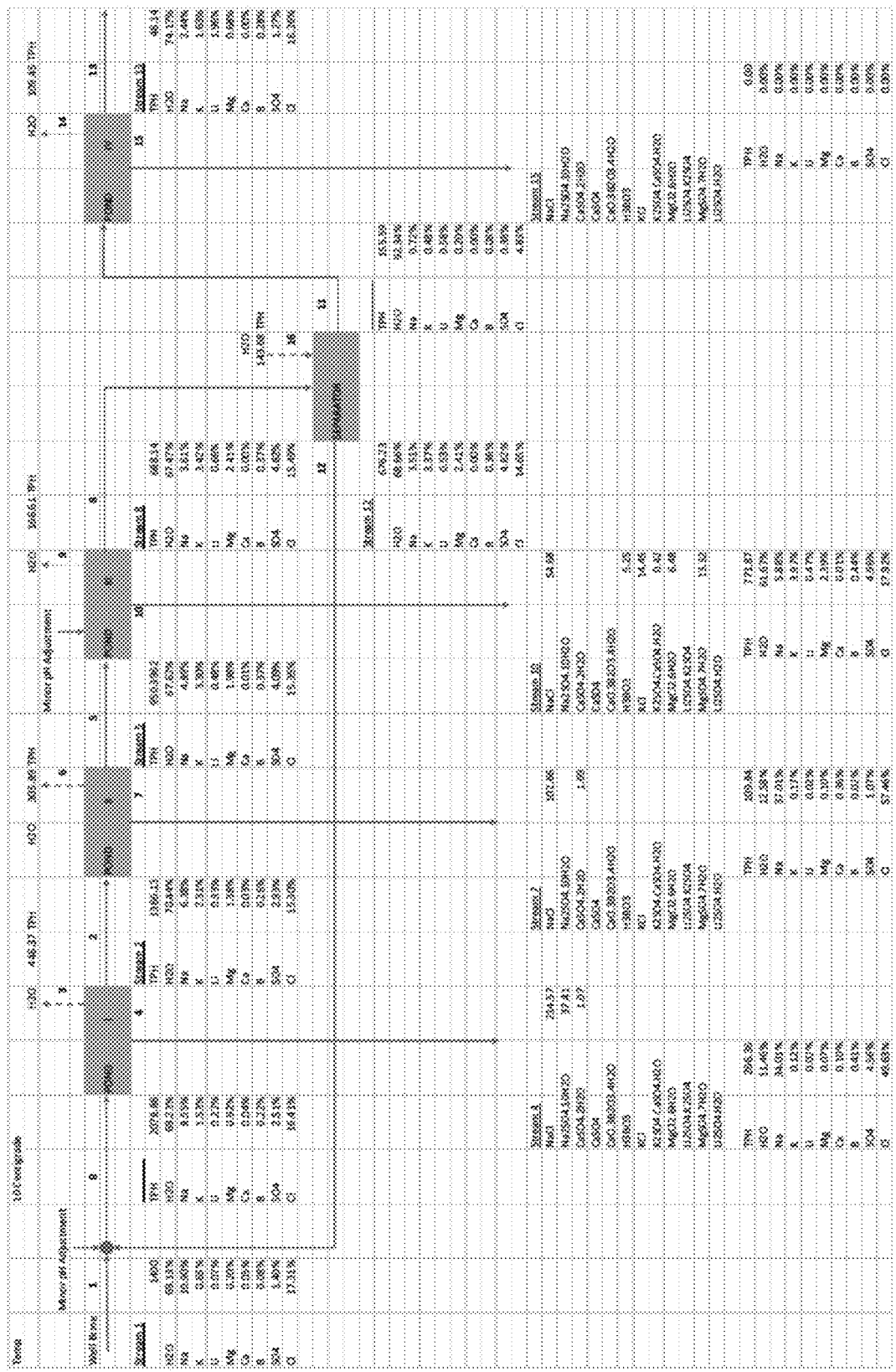
FIG. 11 depicts a mass balance and simulation results of the brine evaporation process of FIG. 10 using preferred aspects of the present disclosure.

FIG. 11 shows the steady-state mass balance of the entire pond sequence after introduction of the separator and recycle of the separator impure stream to Pond I. Some of the excess sulfate recycled by the separator would be precipitated in Pond I as $Na_2SO_4 \cdot 10H_2O$, which can be seen to be an increase from the conventional case. The excess recycling sulfates alters the chemistry of the pond sequence resulting in different solid-liquid equilibrium conditions in the ponds. Due to the high levels of recirculating sulfates, conditions become favorable for the precipitation of epsomite ($MgSO_4 \cdot 7H_2O$) in Pond III. This is where the major proportion of remaining excess sulfate would be removed.

The pure stream from the separator proceeds normally to Pond IV. Here, evaporation can proceed without any co-precipitation of lithium due to the low levels of sulfate. Lithium concentration can now reach 1.95% before co-precipitation of lithium would begin. In the conventional case, lithium concentration without co-precipitation losses would only reach 0.69%.

As shown in FIG. 11 for Example C, a mass balance and simulation results of the brine evaporation process for production of lithium using the invention. Composition numbers do not add to 100% due to rounding and ignoring trace levels of elements.

The invention claimed is:

1. A system for efficiently extracting lithium from brines by reducing lithium losses due to co-precipitation and allowing significantly higher lithium concentration, comprising:
a sequence of two or more solar evaporation ponds configured to allow evaporation of brine to occur in each pond and for brine to flow from a first pond to one or more other ponds in the sequence;
a conduit configured to remove at least a portion of the brine at a brine removal location and transmit the removed brine to a separator whereby one or more impurities are separated from lithium to form a high impurity stream and a low impurity stream;
wherein the high impurity stream is optionally recycled to the sequence of evaporation ponds at a location the same as, upstream from the brine removal location, or disposed in a separate pond or reinjected underground and the low impurity stream is fed to one or more of the brine removal location, to a subsequent pond in the sequence, or to a lithium plant or concentration facility; and
the brine removal location being positioned such that lithium co-precipitation together with the one or more impurities is reduced as compared to an amount of lithium co-precipitation that would occur in the preceding or succeeding ponds in the absence of the separation system;
wherein lithium loss due to co-precipitation is reduced or eliminated.

2. The system according to claim 1, wherein feed to a first pond in the sequence of ponds is a Chilean-type brine.

3. The system according to claim 2, wherein the high impurity stream is recycled to a pond precipitating a salt selected from the group consisting of bischofite, calcium borate, anhydrite, gypsum and carnallite or others.

4. The system according to claim 3, wherein the low impurity stream is fed to a pond that is substantially free of co-precipitated Li in the form of lithium carnallite and lithium metaborate or others.

5. The system according to claim 1, wherein feed to a first pond in the sequence of ponds is a Bolivian-type brine.

6. The system according to claim 5, wherein the high impurity stream is recycled to a pond precipitating a salt selected from the group consisting of bischofite, carnallite, epsomite, kainite, polyhalite, calcium borate, anhydrite, gypsum, hexahydrite and kieserite or others.

7. The system according to claim 6, wherein the low impurity stream is fed to a pond that is substantially free of co-precipitated Li in the form of lithium sulfate, lithium sulfate monohydrate, lithium carnallite, lithium metaborate or others.

8. The system according to claim 1, wherein feed to a first pond in the sequence of ponds is an Argentinian-type brine.

9. The system according to claim 8, wherein the high impurity stream is recycled to a pond precipitating a salt selected from the group consisting of epsomite, gypsum, anhydrite, kainite, Glauber's salt, sylvite or sylvinite, schoenite or others.

10. The system according to claim 9, wherein the low impurity stream is fed to a pond that is substantially free of co-precipitated Li in the form of lithium potassium double salt or lithium schoenite, lithium metaborate, lithium sulfate, lithium sulfate monohydrate or others.

11. The system according to claim 1, wherein the portion of brine removed at the brine removal location comprises about 1 to about 50%, 1 to 25% and preferable 1 to 5% of total brine flow in the ponds.

12. The system according to claim 1, wherein the increase in lithium recovery is from about 10 to about 70% (absolute units).

13. The system according to claim 1, wherein lithium containing brine is pre-concentrated by solar evaporation to a point at the brine removal location at which further concentration would co-precipitate lithium salts.

14. The system according to claim 1, wherein the separator is configured to at least partially separate lithium from impurity cations and anions which have a propensity to form lithium salts that can precipitate under further brine concentration, and which impurity cations and anions are suitable for earlier precipitation with each other in preceding evaporation ponds in the sequence.

15. The system according to claim 1, wherein the separator is a separation selected from the group consisting of a selective ion separation membrane, nanofiltration, ion sorption, ion exchange, solvent extraction and electrodialysis.

16. The system according to claim 1, wherein the separator is a LiTAS™ selective ion separation membrane.

17. The system according to claim 1, further configured to remove borate ions or boric acid in the separation process and recycle and precipitating borate ions or boric acid in previous ponds in the sequence as calcium borate or boric acid, thereby eliminating or substantially reducing a potential requirement for further boron treatment.

18. The system according to claim 1, wherein the separation system comprises a membrane separator operated in a dialysis mode.

19. The system according to claim 1, wherein the separation system comprises a membrane separator operated in an electrodialysis mode.

20. The system according to claim 19 wherein the ion separation system is configured to operate in dialysis mode.

21. The system according to claim 1, comprising recycle of the high impurity stream to a point in one or more preceding evaporation ponds in the sequence where conditions are favorable for precipitation and thus removal of one or more impurity ions without lithium co-precipitation.

22. The system according to claim 1, configured to advance the low impurity stream to a downstream pond, mechanical evaporator, or precipitation plant for further concentration.

23. The system according to claim 22, wherein the further concentration in the downstream pond, mechanical evaporator or precipitation plant occurs substantially without lithium co-precipitation and associated lithium loss.

24. The system according to claim 1, wherein the system is configured to achieve a lithium concentration increase from about 50% to about 400%.

25. A method for improving efficiency in extracting lithium from brines using a sequence of solar evaporation ponds, by reducing lithium losses due to co-precipitation, the method comprising:
separating at least a portion of the brine at a brine removal location to obtain a removed brine;
transmitting the removed brine through a separator such that one or more impurities are separated from lithium to form a high impurity stream (i.e., the impure stream) and a low impurity stream (i.e., the pure stream);

recycling at least a portion of the high impurity stream to the sequence of evaporation ponds at a location the same as or upstream from the brine removal location; or evaporating the high impurity stream, fully or partially, in a separate pond; or re-injecting the high impurity stream underground; and transferring the low impurity stream to one or more of the removal locations, to a subsequent pond in the sequence, or to a lithium plant or concentration facility;

wherein the brine removal location is positioned such that lithium co-precipitation with one or more impurities is reduced from the brine flow and higher concentration of lithium is attained due to lithium co-precipitation reduction or elimination.

26. The method according to claim 25, comprising further concentrating the low impurity stream by evaporation.

27. The method according to claim 25, wherein the separator comprises a selective monovalent-multivalent or monovalent-monovalent ion separation.

28. The method according to claim 27, wherein the separator comprises a LiTAS™ membrane.

29. The method according to claim 28, wherein the LiTAS™ membrane is operated in a dialysis mode.

30. The method according to claim 28, wherein the LiTAS™ membrane is operated in an electrodialysis mode.

31. The method according to claim 25, wherein a lithium concentration is attained in an amount of an increase from about 50% to about 400%.

32. The system according to claim 1, where the high impurity stream is fully or partially evaporated in a separate pond or re-injected underground.

33. The system according to claim 2, wherein the high impurity stream is re-injected underground.

34. The system according to claim 2, wherein the high impurity stream is fully or partially evaporated in a separate pond.

35. The system according to claim 34, wherein the precipitated salts are harvested and processed separately or with the clean concentrated lithium brine in a processing plant.

36. The system according to claim 5, wherein the high impurity stream is re-injected underground.

37. The system according to claim 5, wherein the high impurity stream is fully or partially evaporated in a separate pond.

38. The system according to claim 37, wherein the precipitated salts are harvested and processed separately or with the clean concentrated lithium brine in a processing plant.

39. The system according to claim 8, wherein the high impurity stream is re-injected underground.

40. The system according to claim 8, wherein the high impurity stream is fully or partially evaporated in a separate pond.

41. The system according to claim 40, wherein the precipitated salts are harvested and processed separately or with the clean concentrated lithium brine in a processing plant.

* * * * *

UNITED STATES PATENT AND TRADEMARK OFFICE
CERTIFICATE OF CORRECTION

| | | |
|---|---|---|
| PATENT NO. | : 12,018,347 B2 | Page 1 of 1 |
| APPLICATION NO. | : 17/602808 | |
| DATED | : June 25, 2024 | |
| INVENTOR(S) | : Amit Patwardhan and Teague Egan | |

It is certified that error appears in the above-identified patent and that said Letters Patent is hereby corrected as shown below:

On the Title Page

Item No. (86), Line 3, § 371 (c)(1), (2) Date: "November 18, 2021" should be --October 11, 2021--;

Item No. (57), Line 3, "followed by a separation processes" should be --followed by a separation process--; and In the Claims Claim 11, Column 16, Line 8, "preferable" should be --preferably--.

Signed and Sealed this
Twenty-seventh Day of August, 2024

Katherine Kelly Vidal
*Director of the United States Patent and Trademark Office*